United States Patent [19]

Guhlin

[11] Patent Number: 5,087,064
[45] Date of Patent: Feb. 11, 1992

[54] ANTI-THEFT AND SAFETY DEVICE FOR A BALL AND SOCKET TRAILER HITCH

[76] Inventor: Kjall G. Guhlin, 11727 Sheridan, Houston, Tex. 77050

[21] Appl. No.: 560,855

[22] Filed: Jul. 27, 1990

[51] Int. Cl.⁵ .............................................. B60D 1/28
[52] U.S. Cl. .................................. 280/507; 280/511; 280/432
[58] Field of Search ............. 280/507, 504, 511, 512, 280/513, 432

[56] References Cited

U.S. PATENT DOCUMENTS

| | | | |
|---|---|---|---|
| 3,479,057 | 11/1969 | Miller | 280/511 |
| 3,759,548 | 9/1973 | Kothmann | 280/511 |
| 4,032,171 | 6/1977 | Allen et al. | 280/507 |
| 4,208,065 | 6/1980 | Hansen | 280/507 |
| 4,552,377 | 11/1985 | Folkerts | 280/507 X |
| 4,571,964 | 2/1986 | Bratzler | 280/507 X |
| 4,836,570 | 6/1989 | Lopez et al. | 280/507 |
| 4,840,392 | 6/1989 | Baskett | 280/507 X |

Primary Examiner—Charles A. Marmor
Assistant Examiner—Kevin Hurley
Attorney, Agent, or Firm—Vaden, Eickenroht, Thompson & Boulware

[57] ABSTRACT

An anti-theft, safety device is disclosed for use with ball and socket trailer hitches comprising a base plate clamped to the tow bar near the ball, a post attached at one end to the base plate that extends vertically from the tow bar adjacent to the ball and socket, an upper plate through which the post extends that moves vertically and rotates with respect to the post, a bushing with an opening in register with the opening in the upper plate through which the post extends, both the post and the bushing having transverse openings through which a lock bolt may be passed when the holes are aligned so that the upper plate will be held over the socket to prevent the socket from being disconnected from the ball.

1 Claim, 1 Drawing Sheet

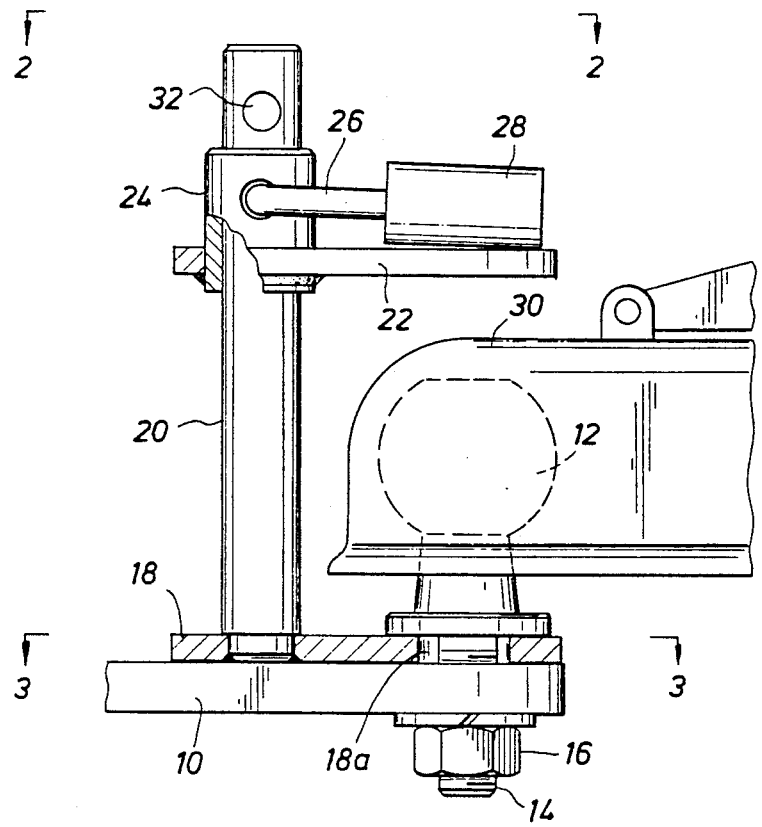
FIG.1
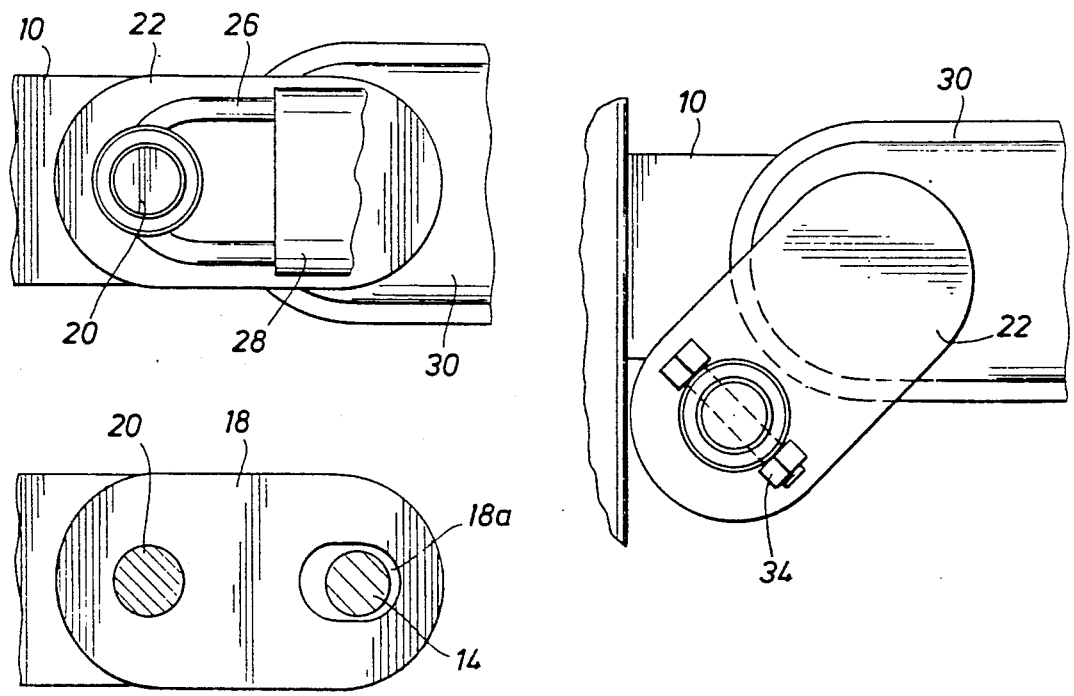
FIG.2
FIG.3
FIG.4

ANTI-THEFT AND SAFETY DEVICE FOR A BALL AND SOCKET TRAILER HITCH

This invention relates to an anti-theft safety device for ball and socket type trailer hitches that prevents the socket either accidentally in the case where the socket was not properly locked on the ball or intentionally where the trailer is being stolen.

There are several prior patents that show various arrangements that are designed to hold the socket on the ball, for example, Stanfield U.S. Pat. No. 3,549,173, which issued Dec. 22, 1970 uses a U-shaped plate having one leg clamped between the tow bar and the ball and the other leg extending over the top of the ball with an eye bolt extending downwardly from the upper leg to a position above the socket to hold the socket on the ball.

Kothmann U.S. Pat. No. 3,677,564, which issued in 1972, uses a very elaborate yoke system in one embodiment and a simple finger placed on top of the socket in another embodiment, the latter embodiment being shown in FIG. 16.

In 1973, Kothmann obtained a second patent, U.S. Pat. No. 3,759,548 where he uses a hinged member attached to a housing that is clamped between the ball and the tow bar to move between a position allowing the socket on the tongue to be removed from the ball and to a position preventing the socket from being lifted from the ball.

Allen et al, U.S. Pat. No. 4,032,171, which issued in 1977, shows a very complicated arrangement for locating a plate above the socket to hold the socket on the ball and allowing the plate to be held in that position by the bolt of a padlock.

Hansen U.S. Pat. No. 4,208,065, which issued in 1980, uses two L-shaped member. One is clamped to the hitch between the ball and the hitch and the other is connected to the upright portion of the first member so that it can pivot into a position over the ball and to a position away from the ball to allow the socket to be moved off the ball. He has various arrangements for locking the pivoted member in position over the ball but none of them are theft-proof.

Hansen also has another patent U.S. Pat. No. 4,291,893, which issued in 1981, which is a division of the prior application that resulted in Hansen '065 patent.

Bell et al U.S. Pat. No. 4,428,596, which issued in 1984, departs from the previously used systems and connects the face of the ball to the tongue directly in a manner to hold the socket on the ball.

In 1984, Avrea et al adds a lock module to the anti-theft device of Hansen to discourage the unauthorized release of the pivoted member that will allow it to be moved from its position preventing the socket from being moved from the ball.

As stated above, all of these patents were directed to devices for keeping the unauthorized or unintentional movement of the socket off the ball. Preventing the intentional movement, of course, is designed to prevent the unauthorized separation of the ball and socket and is to primarily prevent theft of the trailer and whatever the trailer is carrying. The inadvertent separation of the ball and socket, which would occur only when the trailer is being towed, is to prevent the catastrophic results that could occur should that happen while traveling along a highway at the legal speed limit. Most states require a safety chain to be connected between the tongue and the towing vehicle, but they would be of little help if the socket jumped off the ball while the towing vehicle and trailer were moving at a high rate of speed.

It is an object of this invention to provide an extremely simple, uncomplicated attachment to the towing bar of the towing vehicle that will serve to hold the socket on the ball and also prevent theft of the trailer by locking the attachment in such position.

These and other objects and advantages of this invention will be apparent to those skilled in the art from a consideration of the specification, including the attached drawings and appended claims.

IN THE DRAWINGS

FIG. 1 is a side view in elevation of a portion of the tow bar of the towing vehicle, the socket on the end of the tongue of a trailer, the ball attached to the towing bar of the towing vehicle and the apparatus of this invention locked in place to prevent the unauthorized or accidental moving of the socket from the ball;

FIG. 2 is a view taken along line 2—2 of FIG. 1;

FIG. 3 is a sectional view taken along line 3—3 of FIG. 1; and

FIG. 4 is a top view of the device rotated 45° from the position of FIG. 1 to accommodate narrow tow bars.

In the embodiment shown in the drawings, towing bar 10 is attached to the towing vehicle (not shown) and it is to the towing bar that ball 12 is attached. Typically, ball 12 has a threaded shank 14 that extends through an opening in the tow bar and is attached to the tow bar by nut 16.

The attachment of this invention includes lower plate 18 that is provided with hole 18a through which threaded shank 14 extends so that when the ball is attached to the towing bar, as shown in the drawings, lower plate 18 of the attachment will be clamped between the body of the ball and the towing bar. Hole 18a is elongated, as shown in FIG. 3, to accommodate bumpers or tow bars of different widths and different ball and socket sizes.

Post 20 is attached at one end to lower plate 18 and extends vertically upwardly from the plate. Upper plate 22 has an opening in which bushing 24 is located. Post 20 extends upwardly through bushing 24 thereby allowing upper plate 22 to both pivot and move vertically relative to the post when it is not locked to the post. In the drawing, the upper plate is locked to post 20 by bolt 26 of padlock 28. The bolt extends through lateral openings in the post and bushing that are aligned when upper plate 22 is positioned over socket 30, which is attached to the tongue of the trailer (not shown).

There are two sizes of balls in general use. The arrangement shown in Figure is for the smaller ball. Therefore, post 20 is provided with a second transverse opening 32 higher up on the post to allow the plate to be moved to a position to accommodate the larger ball and socket.

There may be occasions where the tow bar is not wide enough to position the attachment of this invention in the manner shown with the lower plate extending along the tow bar. Therefore in those circumstances lower plate 18 is pivoted to the position shown in FIG. 4 where it can serve the same purposes described above. Here bolt 34 locks the upper plate in position on the post. Padlock 28 could also be used and would be preferred in most cases.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. An attachment for use with a trailer hitch of the type which includes a tow bar mounted on the towing vehicle, a ball including a threaded shaft connected to the ball mounted on the tow bar, a trailer having a tongue, a socket mounted on the tongue that engages the ball and connects the trailer to the towing vehicle, said attachment comprising a base plate including an opening through which the threaded shaft extends to clamp the base plate to the two bar by the ball to allow the base plate to be clamped to the tow bar at an angle to the tow bar as required by the width of the tow bar, a post having one end attached to the base plate and extending vertically adjacent the ball and socket, an upper plate having an opening through which the post extends and allows the upper plate to move vertically and rotate relative to the post, a bushing connected to the upper plate having an opening in register with the opening in the upper plate, both the post and the bushing having transverse openings that when aligned will receive the bolt of a lock that will hold the upper plate in position over the socket to prevent the socket from being disconnected from the ball until the bolt is removed and the upper plate is moved out of the way.

* * * * *